United States Patent
Hayton et al.

(10) Patent No.: US 10,277,606 B2
(45) Date of Patent: *Apr. 30, 2019

(54) ANONYMOUS APPLICATION WRAPPING

(71) Applicant: Citrix Systems, Inc., Fort Lauderdale, FL (US)

(72) Inventors: Richard Hayton, Cambridge (GB); Georgy Momchilov, Parkland, FL (US); Gary Barton, Boca Raton, FL (US); Andrew Innes, Milton (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,127

(22) Filed: Mar. 2, 2018

(65) Prior Publication Data

US 2018/0191731 A1 Jul. 5, 2018

Related U.S. Application Data

(63) Continuation of application No. 14/804,705, filed on Jul. 21, 2015, now Pat. No. 9,942,240.

(51) Int. Cl.
*G06F 21/00* (2013.01)
*H04L 29/06* (2006.01)
(Continued)

(52) U.S. Cl.
CPC ............ *H04L 63/105* (2013.01); *G06F 21/10* (2013.01); *G06F 21/629* (2013.01);
(Continued)

(58) Field of Classification Search
CPC ... H04L 63/105; H04L 63/0281; H04L 63/08; G06F 21/629; G06F 21/10; H04W 12/08; H04W 12/06

See application file for complete search history.

(56) References Cited

U.S. PATENT DOCUMENTS

| 7,908,642 B2 | 3/2011 | Rubio et al. |
| 8,190,757 B1 | 5/2012 | Davis et al. |

(Continued)

FOREIGN PATENT DOCUMENTS

| CN | 101379503 A | 3/2009 |
| CN | 102024121 A | 4/2011 |
| CN | 102640160 A | 8/2012 |

OTHER PUBLICATIONS

Oct. 10, 2016—(EPO) International Search Report and Written Opinion—App No. PCT/US16/42894.

(Continued)

*Primary Examiner* — Brandon S Hoffman
*Assistant Examiner* — William A Corum, Jr.
(74) *Attorney, Agent, or Firm* — Banner & Witcoff, Ltd.

(57) ABSTRACT

Methods and systems are disclosed for providing approaches to anonymous application wrapping on a mobile device. The methods and systems may include receiving, by a controller service, a request to associate a first application executing on a client device with the controller service, and obtaining, by the controller service, a first application identifier associated with the first application. The methods and systems may also include receiving, by the controller service from an application service, a request for a first service and a conditional application identifier, and configuring, by the controller service and based on the request for the first service, the first application with a second set of one or more policy instructions used to control the first application.

20 Claims, 7 Drawing Sheets

(51) Int. Cl.
*H04W 12/06* (2009.01)
*H04W 12/08* (2009.01)
*G06F 21/10* (2013.01)
*G06F 21/62* (2013.01)

(52) U.S. Cl.
CPC .......... *H04L 63/0281* (2013.01); *H04L 63/08* (2013.01); *H04W 12/06* (2013.01); *H04W 12/08* (2013.01)

(56) References Cited

U.S. PATENT DOCUMENTS

| | | |
|---|---|---|
| 2013/0298185 A1 | 11/2013 | Koneru et al. |
| 2014/0032691 A1 | 1/2014 | Barton et al. |
| 2014/0109078 A1 | 4/2014 | Lang et al. |
| 2014/0173700 A1 | 6/2014 | Awan et al. |
| 2014/0297824 A1 | 10/2014 | Batson et al. |
| 2015/0381547 A1 | 12/2015 | Mandanapu et al. |

OTHER PUBLICATIONS

Jul. 21, 2017 (U.S.)—Non-final Office Action—U.S. Appl. No. 14/804,705.

Dec. 1, 2017—(U.S.) Notice of Allowance—U.S. Appl. No. 14/804,705.

ANONYMOUS APPLICATION WRAPPING

CROSS-REFERENCE TO RELATED APPLICATIONS

This application is a continuation of U.S. patent application Ser. No. 14/804,705, filed on Jul. 21, 2015, and entitled "Anonymous Application Wrapping," hereby incorporated by reference in its entirety.

FIELD

Aspects of the disclosure generally relate to computing hardware and computer software. In particular, one or more aspects of the disclosure relate to anonymous application wrapping on a mobile device.

BACKGROUND

Mobile devices have become indispensable in our daily lives. More and more people are using mobile devices in personal and business settings for a variety of purposes. The privacy of users, especially in a personal setting, is becoming more important in today's society. Current application wrapping techniques associate a wrapped application with an enterprise user account. In addition, policies for the wrapped application are delivered primarily or partly based on the identity of the user. Thus, with current techniques, a user's identity or user account information could be exposed to a rogue application or to an entity to which the user might not want this information provided. Thus, there is a need for people to generate managed applications in an anonymous manner.

SUMMARY

As a general introduction to the subject matter described in more detail below, aspects described herein are directed to processing and modifying an unmanaged application to generate a managed application on a mobile device. Aspects described herein are also directed to installing or saving the generated managed application on that single mobile device.

One or more aspects of the disclosure provide for a method that may include receiving, by a controller service from a client device, a request to associate a first application executing on the client device with the controller service, the controller service being configured to control the first application via one or more policy instructions located on the client device and enforced by a mobility management system on the client device, wherein each policy file defines one or more restrictions enforced on or one or more enablements granted to the first application by the mobility management system and obtaining, by the controller service, a first application identifier associated with the first application, the first application identifier corresponding to a first set of the one or more policy instructions used to control the first application. The method may also include receiving, by the controller service from an application service, a request for a first service and a conditional application identifier; and responsive to the conditional application identifier matching the first application identifier, configuring, by the controller service and based on the request for the first service, the first application with a second set of one or more policy instructions used to control the first application.

One or more aspects of the disclosure provide for a system that includes at least one processor; and at least one memory storing instructions that, when executed by the at least one processor, cause the system to perform one or more steps. The steps the system may perform may include receiving, by a controller service from a client device, a request to associate a first application executing on the client device with the controller service, the controller service being configured to control the first application via one or more policy instructions stored on the client device and enforced by a mobility management system on the client device, wherein each policy file defines one or more restrictions enforced on or one or more enablements granted to the first application by the enterprise mobility management system and obtaining, by the controller service, a first application identifier associated with the first application, the first application identifier corresponding to a first set of the one or more policy instructions used to control the first application. The steps may also include receiving, by the controller service from an application service, a request for a first service and a conditional application identifier; and responsive to the conditional application identifier matching the first application identifier, configuring, by the controller service and based on the request for the first service, the first application with a second set of one or more policy instructions used to control the first application.

One or more aspects of the disclosure provide for one or more non-transitory computer-readable storage media having instructions stored thereon, that when executed by one or more processors, may cause the one or more processors to perform steps. The steps that the one or more processors perform may include receiving, by a controller service from a client device, a request to associate a first application executing on the client device with the controller service, the controller service being configured to control the first application via one or more policy instructions located on the client device and enforced by a mobility management system on the client device, wherein each policy file defines one or more restrictions enforced on or one or more enablements granted to the first application by the mobility management system and obtaining, by the controller service, a first application identifier associated with the first application, the first application identifier corresponding to a first set of the one or more policy instructions used to control the first application. The steps may also include receiving, by the controller service from an application service, a request for a first service and a conditional application identifier; and responsive to the conditional application identifier matching the first application identifier, configuring, by the controller service and based on the request for the first service, the first application with a second set of one or more policy instructions used to control the first application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
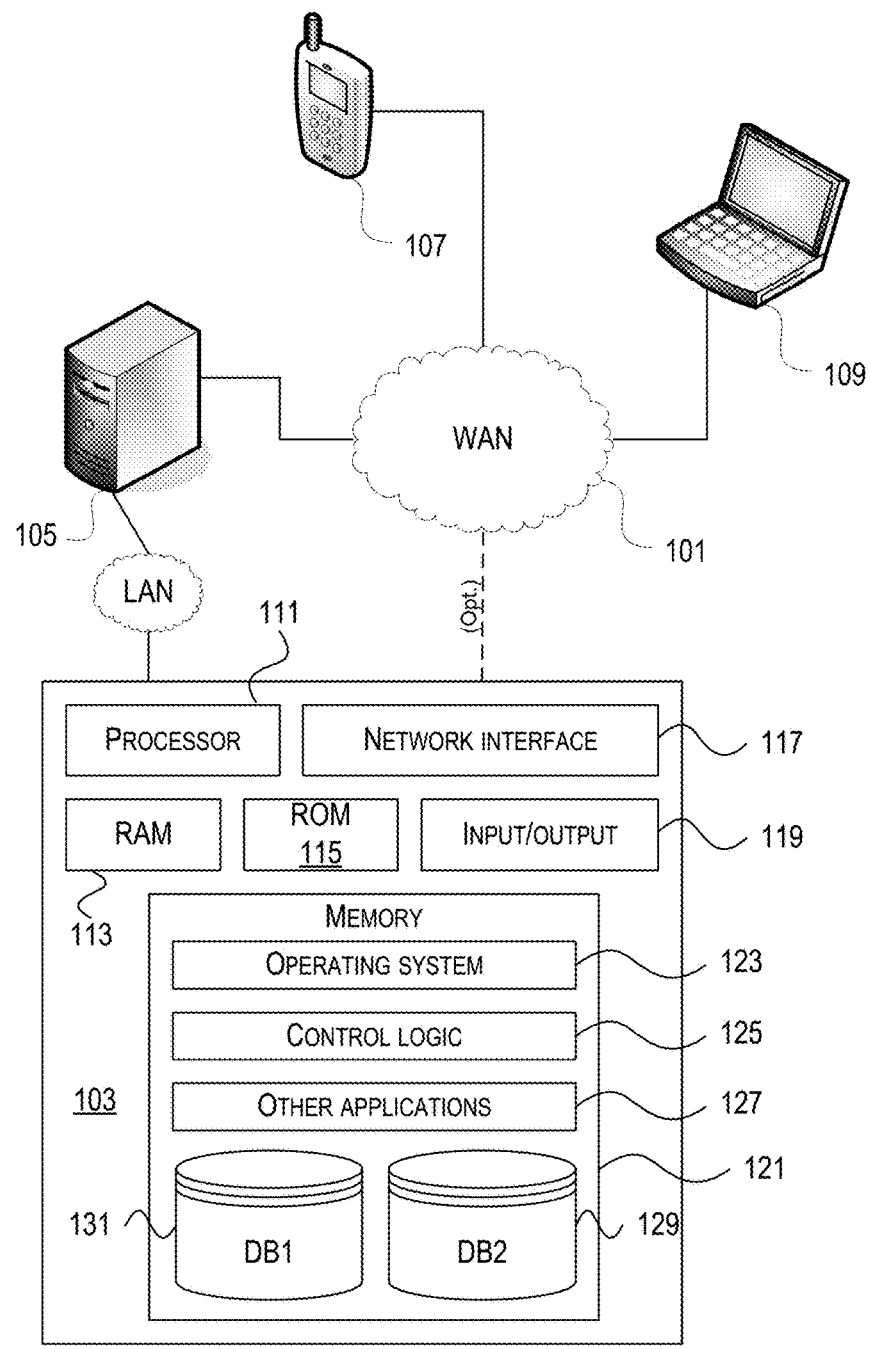
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
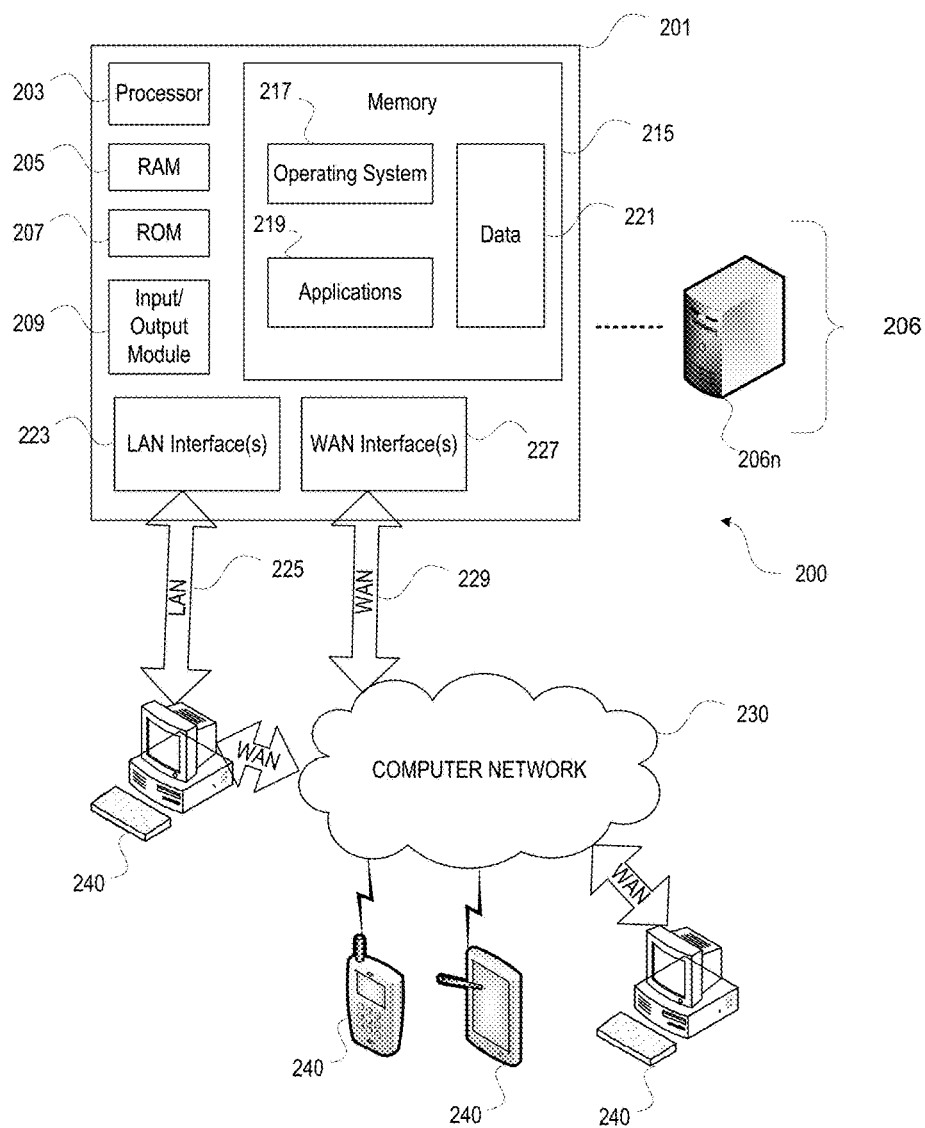
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
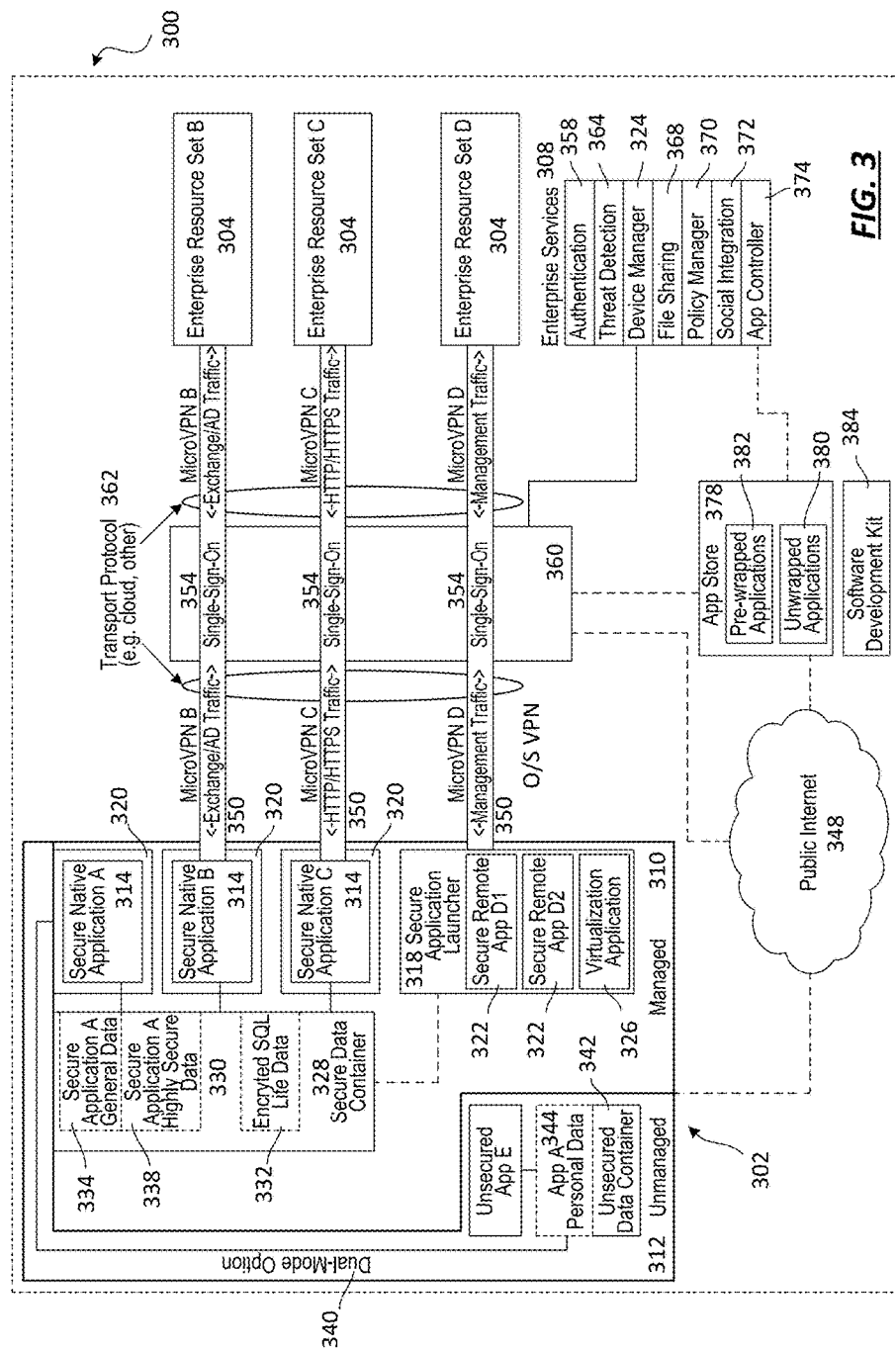
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
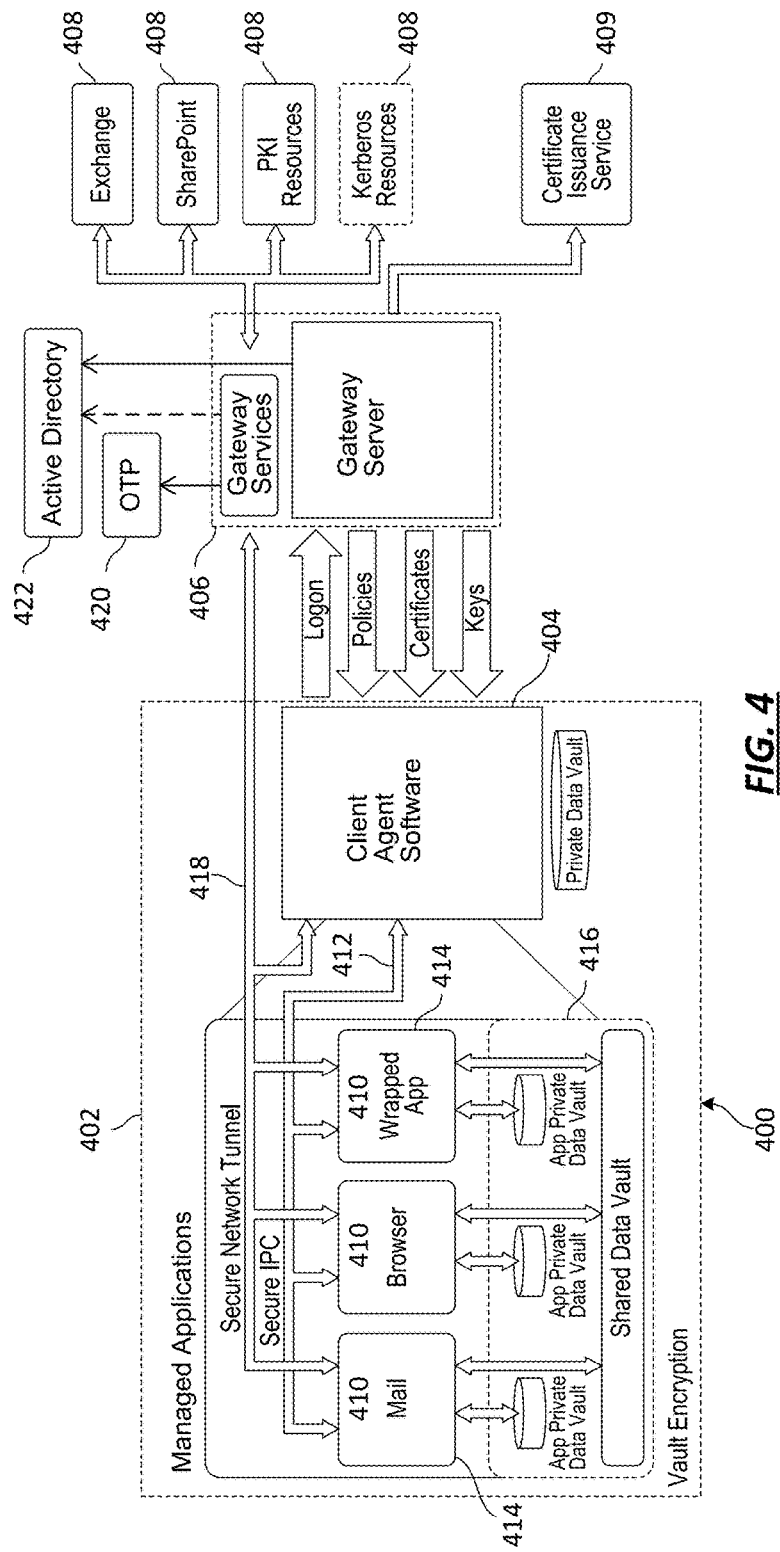
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Anonymous Application Wrapping

One or more disclosed aspects may provide for anonymous application wrapping. For example, one or more disclosed aspects may include applications that may be wrapped like an enterprise application but the wrapping process may associate the wrapped application with a particular user or a particular device (e.g., user identifying information). Disclosed aspects may be used by the general population of users in addition to just users associated with an enterprise. For example, customers that might not be associated with or employed by an enterprise may be able to use the disclosed applications (e.g., wrapped applications) in accordance with one or more features described herein. Disclosed aspects may allow one or more policies (e.g., similar to or the same as mobile device management (MDM) policies) to be enforced on a wrapped application, but might not require knowledge of individual users (e.g., user accounts, identifying information, etc.).

One or more disclosed aspects may include the ability to enable access to protected resources (e.g., intranet resources), such as web services. According to some aspects, this access may be controlled by an application level policy (e.g., application X may access service Y). According to some aspects, this access may be controlled by other factors, such as an application instance being associated with a level of service. For example, in banking application, an application instance may be associated with a level of service (e.g., silver/lower level, gold/middle level, platinum/upper level, and the like). In another example, an application instance may be associated with having to pay a fee for a particular service (e.g., paying a fee for account overdraft, etc.).

One or more disclosed aspects may include the ability to selectively lock or wipe application data. For example, in a banking application, the banking application may be revoked and/or have the data wiped if an associated customer account was in poor standing or the device was reported lost. According to some aspects, an application service associated with the application or the associated bank may send this request to a controller service, and then the controller service may send this wipe instruction or policy to the client device executing the banking application.

One or more disclosed aspects may include the ability to encrypt data for an application. This encryption may be performed based on anonymous or partially anonymous information. According to some aspects, this anonymous or partially anonymous information may be provided by a controlling server (e.g., a controller). According to some aspects, the encryption may be performed by an application wrapper.

Disclosed aspects may include managing a plurality of applications on a single device. According to some aspects, an application service (e.g., a bank service) might not know that two applications are on the same device, as this may be a violation of privacy. For example, if a user installs an application for a first bank and an application for a second bank on a device, the banks (and associated applications) might not have knowledge of each other. Disclosed aspects address the situation where the user may wish for the applications to have knowledge of each other.

Figure 5:
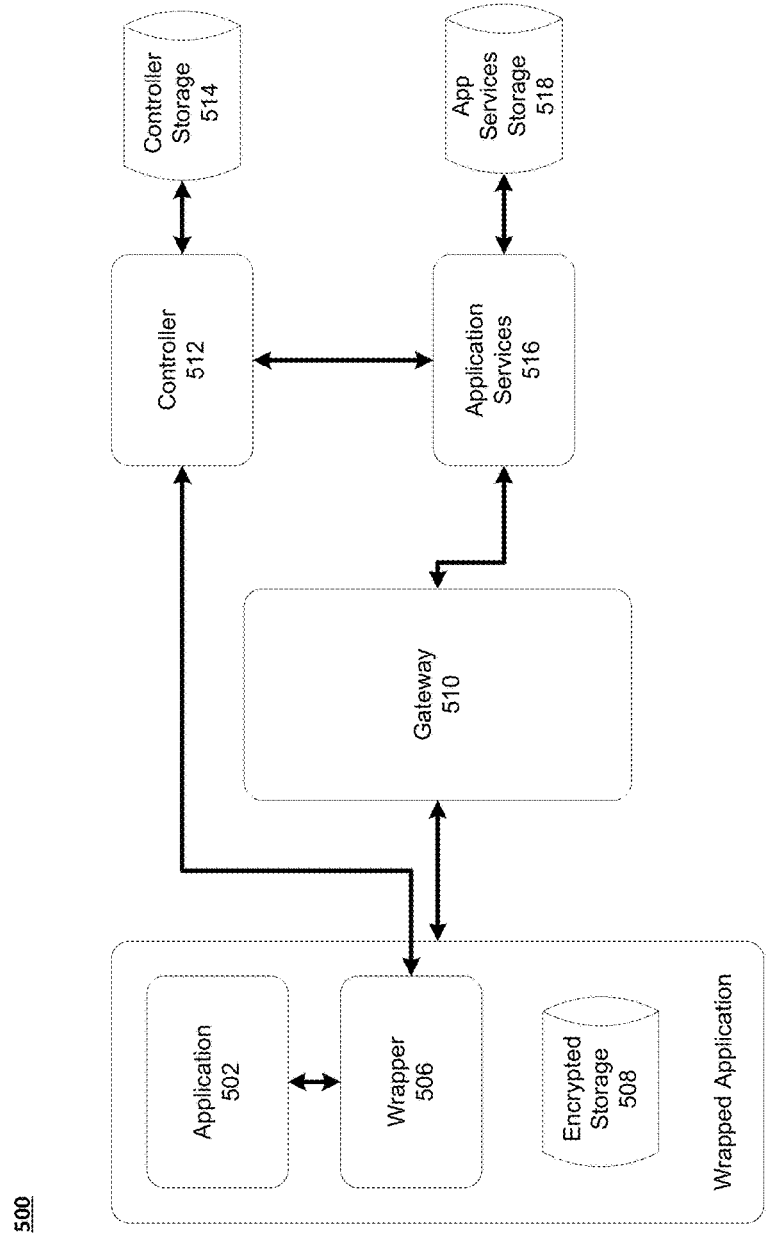
FIG. 5 depicts an illustrative diagram showing an example system in accordance with one or more features described herein.

FIG. 5 is an illustrative system 500 that may implement one or more features described herein. According to some aspects, system 500 may be a mobility management system, which may be a system configured for managing mobile applications or devices via application management by wrapping and/or intercepting calls made by an application. Components of the system 500 may be similar to or may be the components of FIGS. 1-4. System 500 may include a wrapped or managed application 502, which may be similar to or may be the managed application 410. Managed application 502 may be located on and/or execute on a computing device, such as a mobile device, which may be the terminal 240, the client device 302, or the enrolled mobile device 402. According to some aspects, the application 502 may be a single instance of a particular type of application (e.g., a banking application). For example, if 100 mobile devices each execute its own instance of a banking application, the managed application 502 may be just one instance of this banking application, which may be identified distinctly from other instances of the banking application executing on the other mobile devices. The managed application 502 may be associated with a wrapper 506, which may be similar to or may be the wrapper 320. According to some aspects, the wrapper 506 may be part of the managed application 502 or may be independent and/or external to the managed application 502. The managed application 502 may include a memory or storage 508. According to some aspects, the storage 508 may be an encrypted storage 508. System 500 may also include a gateway 510, which may be similar to or may be the gateway 360. System 500 may also include a controller 512, which may be similar to or may be the app controller 374 and may communicate with a database 514. The controller 512 may be a controlling service or server that may control the operation of the managed application 502. The database 514 may store identifications of application instances and one or more corresponding properties for the application instances (this will be described below in more detail). System 500 may also include an application services server or module 516, which may communicate with a database 518. The database 518 may store user identification information and one or more corresponding identifications of application instances. According to some aspects, the components of the system 500 may interact or communicate with other components of the system 500 (e.g., as illustrated in FIG. 5 with arrows). Such communications may be, for example, API calls, etc.

Figure 6:
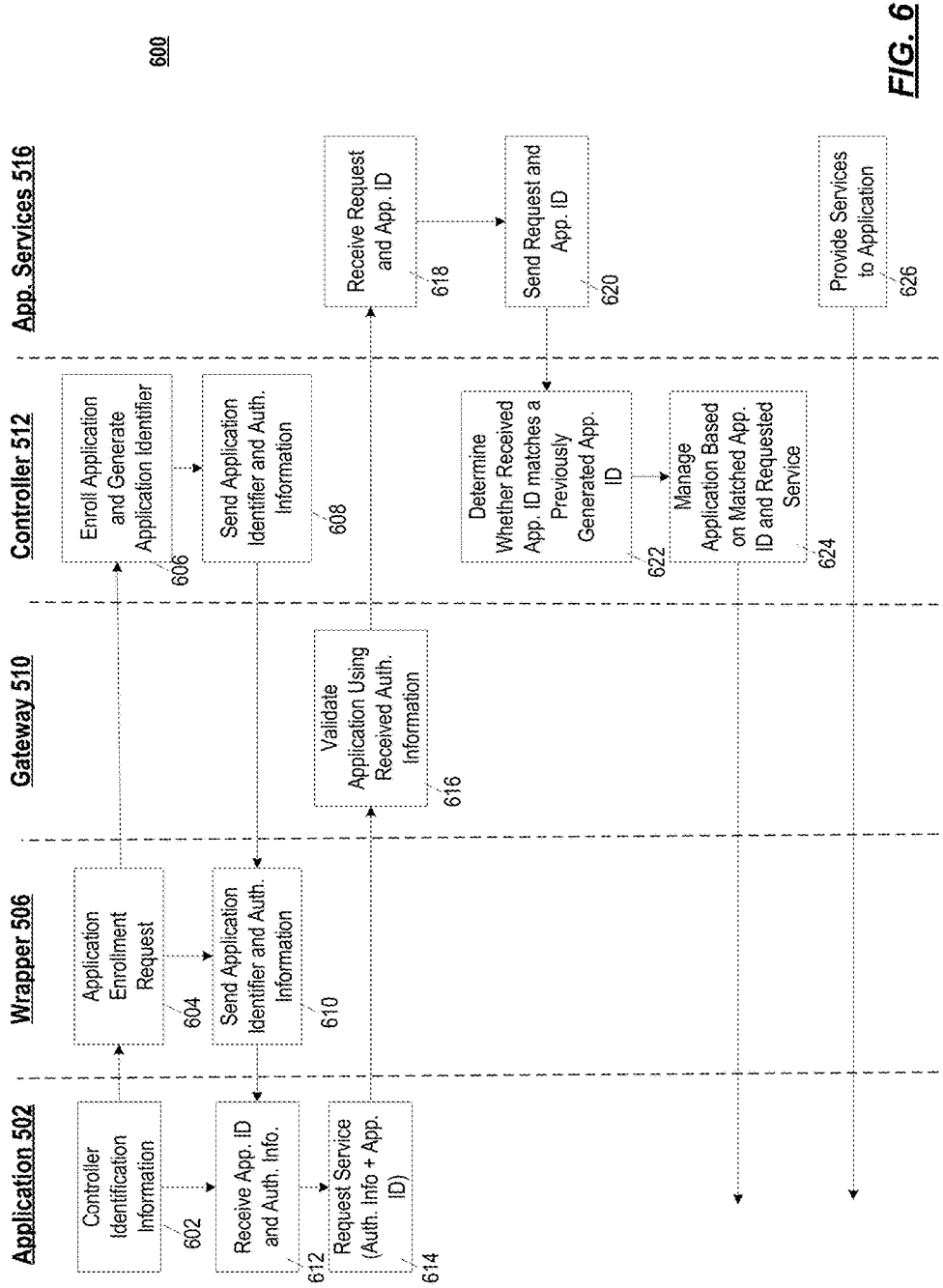
FIG. 6 depicts an illustrative flow diagram showing an example process of anonymous application wrapping in accordance with one or more features described herein.

FIG. 6 is an example communication flow process 600 illustrating one or more features described herein. Process 600 may be performed by one or more of the computing devices or components disclosed in FIGS. 1-5. For example, process 600 may be implemented by the managed application 502, wrapper 506, storage 508, gateway 510, controller 512, database 514, application services module 516, and/or the database 518, as well as other disclosed components or devices. In one or more embodiments, the process 600 illustrated in FIG. 6 and/or one or more steps thereof may be performed by any device or component(s) of FIGS. 1-5. In other embodiments, the process illustrated in FIG. 6 and/or one or more steps thereof may be embodied in computer-executable instructions that are stored in a computer-readable medium, such as a non-transitory computer-readable memory. The steps in this flow process 600 need not all be performed in the order specified and some steps may be omitted and/or changed in order.

Process 600 may describe an approach where an application instance may associate with a controller 512 that manages application instances on behalf of a service provider (e.g., the application services 516). For example, the service provider may be a bank or some other entity or company. According to some aspects, there may be a plurality of controllers 512, a plurality of applications 502, and/or a plurality of application instances.

Process 600 may begin at step 602, where the application 502 may transmit (e.g., via an API call) an identification of a controller 512 to the wrapper 506. The identification may be a location or address of the controller 512. According to some aspects, there may be more than one controller 512. According to some aspects, the identification of the controller 512 may be inserted into the application 502 before, during, or after the wrapping process. For example, a user may download or install a generic banking application. The generic banking application may allow the user to select a bank from a list of banks, a level of service (e.g., silver, gold, platinum), and the like. According to one or more aspects, the application 502 (or other component described herein) may identify a controller (and location, etc.) based on the user's selection, and the API may be used to indicate that controller location. For example, if the user selects bank A from the list of banks, then the API may identify controller A. If the user selects bank B from the list of banks, then the API may identify controller B. In another example, if the user selects silver service, then the API may identify controller C. If the user selects platinum service, then the API may identify controller D.

At step 604, after the wrapper 506 receives the identification of the controller 512, the wrapper may send an enrollment request to the controller 512 using the location or identification information of the controller 512. The enrollment request may be a request for wrapping the application 502. According to some aspects, the enrollment request may also include any other information, such as a level of service (e.g., silver, gold, platinum), and the like.

At step 606, after receiving the enrollment request from the wrapper 506, the controller 512 may enroll the application 502 or otherwise associate the application 502 with the controller 512. According to some aspects, the controller 512 might not make a device level association (e.g., might not associate with the device that the application 502 is located), but may associate an application instance for the application 502. According to some aspects, the controller 502 may generate and/or assign an identifier to the application instance. For example, the controller may assign application instance #567 to the banking application. In some embodiments, the controller 512 may save or store an application identifier in a database 514. For example, the controller may store in the database 514 that application instance #567 may correspond to a gold level banking application and thus may associate gold level banking policies with the application instance #567. Thus, according to some aspects, whenever the controller 512 retrieves the application instance #567 entry from the database 514 (or otherwise retrieves the application instance #567), the controller 512 may determine the policies or properties associated with or corresponding to the application instance #567. According to some aspects, the controller 512 may generate application identifier (e.g., the application instance number). According to some aspects, the application 502 may generate the application identifier (e.g., and may send the identifier to the controller 512). According to some aspects, another component or entity may generate the application identifier.

The controller 502 may use the application identifier for subsequent uses and at later times, such as to retrieve one or more policies (e.g., policy files, policy instructions, etc.) used in the management of an application that may correspond to the application identifier (which will be described below in more detail). The controller 512 may determine, assign, and/or generate the identifier via a number of different ways. For example, the identifiers may be assigned on a first-come/first-served basis. The identifiers may be assigned randomly. According to some aspects, the identifier may be based on one or more selections made by the user prior to enrollment. For example, a gold level banking association may be assigned a particular identifier, while a silver level banking association may be assigned a different identifier. According to some aspects, the controller 512 may generate a client certificate that may identify the application instance. For example, the controller 512 may store of pre-generated certificates and may associate or provide the certificates on a first-come basis. According to some aspects, a second application may associate with this same controller 512 or a different controller. In the case where the second application may associate with the same control 512, the controller 512 may treat each application separately. According to some aspects, where the second application might be located on the same client device as the first application, the controller 512 may treat the two applications in a joint manner, which will be discussed below in more detail.

At step 608, the controller 512 may transmit the application identifier (e.g., applicant instance number) to the wrapper 506. According to some aspects, the controller 512 may transmit other information to the wrapper 506. For example, the controller may transmit security information, such as authentication information (e.g., certificates), that may be used by the application 502 to access services via a gateway 510.

At step 610, the wrapper 506 may transmit the application identifier (and any other information) to the application 502.

At step 612, after receiving the application identifier and any other information, the application 502 may now be enrolled or wrapped. Post enrollment, the controller 512 may send policies or otherwise configure the application 502. For example, the controller 512 may send a policy that may enable encrypted storage (e.g., via the storage 508). In another example, the controller 512 may enable the application for micro VPN access to certain servers. In another example, the controller 512 may transmit policies in accordance with a level of service (e.g., silver level service, etc.).

At step 614, the application 502 may request a service (e.g., a banking service, an updated level of service from silver level to gold level, etc.) and may transmit the request, application identifier, and any authentication information to the gateway 510. According to some aspects, the application 502 may send this request and information to a gateway 510. According to some aspects, the application 502 may send the authentication information that may have been provided by the controller 512 or other authentication information or credentials. In some cases, the gateway 510 may request authentication information from a user (e.g., interactively request this information).

At step 616, after authenticating the application 502, the gateway 510 may then transmit the information received in step 614 (e.g., authorization information, application identifier, etc.) to the application services 516 (e.g., the service that the application 502 requested). In some cases, the application 502 may request information from a user, such as credentials, user account information, payment details, and the like. According to some aspects, there might not be a gateway 510. In such cases, the application 502 may communicate directly with the application services 516.

At step 618, the application services 516 may receive the application identifier, the request, and any other information. According to some aspects, the application services 516 might not know the user identity, such as in an anonymous system (e.g., purely anonymous). Anonymous systems may include applications that may require uniform service (e.g., no user level tiers or discrimination required) or to applications that may require tied service based on one or more external factors, such as a payment. According to some aspects, in such anonymous systems, individual actions, such as application wipe, may still be deployed provided that the application identity may be recovered. This situation may apply when an application provides the user with information to be revealed at a subsequent time if the device is lost.

At step 620, the application services 516 may communicate with the controller 512 (e.g., via an API call) and may transmit the received application instance to the controller 512.

At step 622, the controller 512 may then determine whether the received application identifier matches an application identifier that the controller 512 previously associated with an application. According to some aspects, the controller 516 may make this determination by inspecting the database 514 to determine whether the application instance exists, and if it does, what properties (e.g., managed application policies, etc) are associated that instance. For example, at step 606, the controller 512 may have assigned an application instance #567 to the banking application 502. After determining that there is a match between the application instance number received from the application services 516 and the entry in the database, the controller 512 may determine that application instance #567 may be associated with a platinum account, and therefore may have access to services that a silver account might not have. For example, the application services 516 (at step 620) may determine that the application is a platinum customer (e.g., via database 518) and may communicate to the controller 512 that a stronger encryption may be needed for the application 502. The controller 512 might not know who the user is or might not know any user identifying information, but the controller 512 may know that there needs to be a different level policy for this application instance compared to other application instances (e.g., based on matching the application instance with an entry in the database 514). An example situation where this may apply may be where a user uses a credit card to pay for platinum status, and the enterprise might not want a link to the user identity because of privacy issues. Thus, the controller 512 may determine the level of policy based on the received application identifier. In another example, at a later time, the controller 512 may determine that the application 502 should be wiped, such as in response to a device being reported lost or stolen. In such a case, the controller 512 may communicate with the application 502 or the client device, and may send an instruction to wipe the application 502 from the client device.

At step 624, the controller 512 may then send or transmit to the application 502 any properties or otherwise configure the application 502 (e.g., manage the wrapped application 502) based on whether the application instance matches a database entry. According to some aspects, the controller 512 may return other information to the application services 516 (e.g., level of service such as silver, gold, platinum, etc.) According to some aspects, the application services 516 may at any time adjust one or more properties that may correspond to (e.g., stored against) an application identity by calling the controller 512. For example, a user may use the application 502 to call the application services 516 to upgrade the user's account to platinum. In another example, a user's previous payment may expire, which may lead the application services 516 to downgrade the user (e.g., the application identity) back to a lower level (e.g., silver).

At step 626, the application services 516 may provide services (e.g., banking services, etc.) to the application based on an identification of the user or device. The process 600 may end after any step.

Disclosed embodiments may allow for the change of a classification of an application instance, such that the policies, access paths, and any other mechanisms that may be controlled by the wrapper 506 may be updated by the controller 512. For example, the controller 512 may mark an application as a platinum member. This feature may allow the application services 516 to control or otherwise provide services to the application 502 or application instance. This feature may also result in access to additional services being permitted or additional protection capabilities being enabled or disabled.

Disclosed embodiments may allow for the locking or wiping of the application instance (e.g., in response to a device being reported as lost). In such a situation, an external service or a database (e.g., database 518) may be used to remember or store the devices and/or application instances belonging to a particular customer or user.

Disclosed embodiments maybe used to gather diagnostic information for a particular device. For example, a helpdesk may wish to gather information of a particular device and may use a communication API between the application services 516 and the controller 512. According to some aspects, a self-help capability may be built into an application 502 and may lead to an API call between the application 502 and the wrapper 506.

Figure 7:
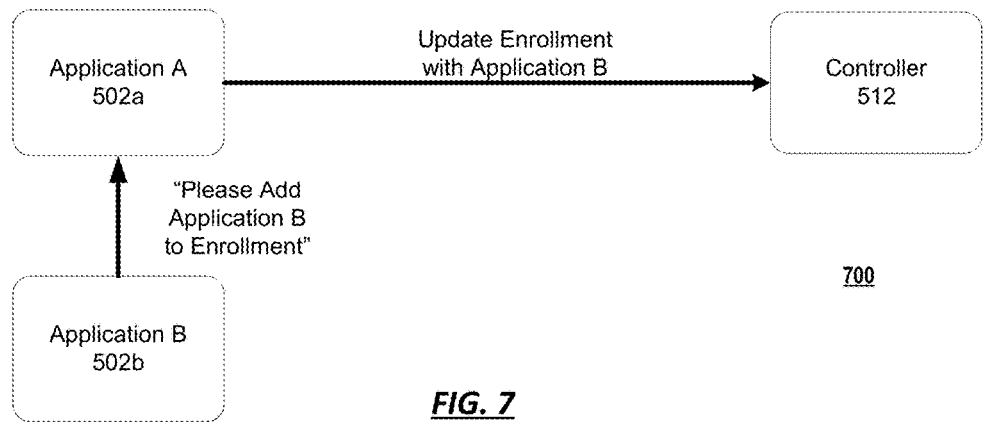
FIG. 7 depicts an illustrative diagram showing an example system configuration in accordance with one or more features described herein.
Figure 8:
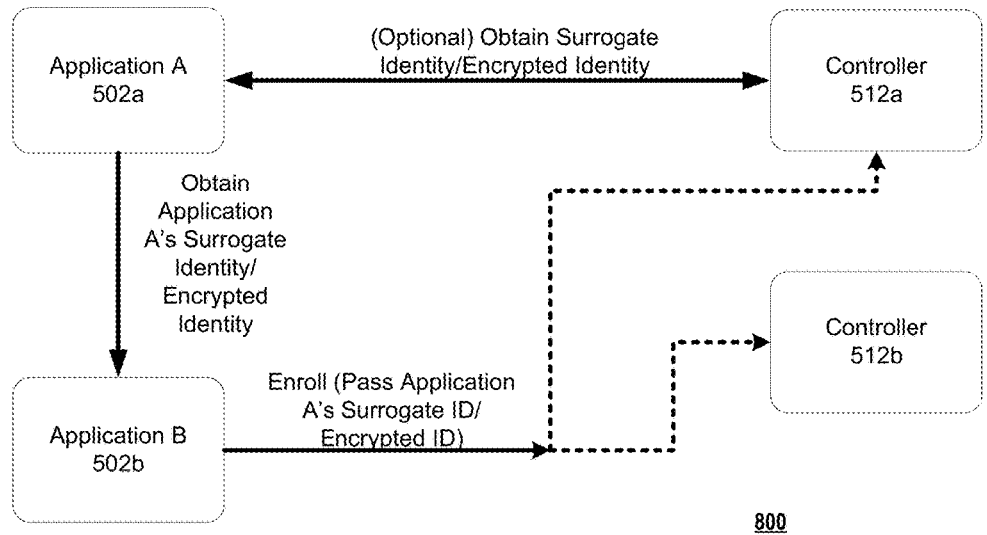
FIG. 8 depicts an illustrative diagram showing an example system configuration in accordance with one or more features described herein.

FIGS. 7 and 8 illustrate two example system diagrams implementing multiple applications in accordance with one or more features described herein. Disclosed aspects may include multiple applications running cooperatively on a client device. According to some aspects, different application identities (or other identifying information) may be reconciled so that two or more application instances on a client device (e.g., two or more applications executing on a client device may share a single identity or may function as a single unit (as shown in FIG. 7). According to some aspects, each application may retain a unique identity (e.g., unique application instances), and a controller may separately associate with each application identity (as shown in FIG. 8).

For example, a client device may execute a suite of applications 502 that may include an application for the user's checking account, an application for the user's stocks, an application for the user's insurance, and the like. If, for example, there is a need to wipe or lock the applications 502 on the client device (e.g., losing the client device, etc.), then disclosed embodiments present a convenient way of managing a plurality of the applications 502 on the client device as a unit. Thus, a controller 502 may be able to wipe and/or lock a plurality of applications without, for example, the user entering authentication information (e.g., PIN, login, etc.) for each application that may need to be locked or wiped. Thus, disclosed aspects may enable a user to log into a first application 502 and then sign into other applications via the first application 502.

According to some aspects, various communication mechanisms may be used to allow an application 502 on a client device to discover other applications 502 on that client device. In some cases, an application 502 (or other component) may make the application 502's presence hard to detect by other applications 502 and other components. Disclosed embodiments allow different applications that may be cooperating with each other to discover the other's identity but also may prevent rogue and/or unrelated applications from discovering other applications on the client device.

FIG. 7 illustrates an example system diagram 700 showing a second application 502b joining a first application 502a for enrolling with a controller 512. The first application 502a may have previously enrolled (e.g., via the process 600) with the controller 512. Thus, the controller 512 may associate with and/or manage the first application 502a. In such a case as in FIG. 7, the second application 502b may discover that the first application 502a is on the same device prior to the enrollment of the second application 502b. As an alternative to the second application 502b undergoing enrollment by itself (e.g., via the process 600), the second application 502b may inform the first application 502a to enroll the second application 502b on behalf of the second application 502b. Thus, the second application 502b may inform the first application 502a that the second application 502b is present on the device and may instruct the first application 502a to contract the controller 512 so that the controller 512 may enroll the second application (e.g., generate or assign an application identifier to the second application 502b, which may the same or different application identifier as the first application). In one example, FIG. 7 may illustrate a situation where a user may be able to add a second application to an existing account with minimal risk that an associated identity (and any user data) may be exposed to a third party. Thus, a user may log in to multiple applications by logging into a first application due to the sharing of data between these trusted applications. For example, a user may wish to go into a checking account (e.g., a first application) and move some money into a brokerage account (e.g., a second application) from that checking account. This process may involve these two applications communicating with each other. This process may also involve only one application instance being associated with both applications. Thus, when a user logs into the checking account via the first managed application, the user may also log into the brokerage account via the second managed application.

According to some aspects, the first application 502a might not have previously enrolled with the controller 512 but may be on the verge of enrolling with the control 512. In such a case, the second application 502b may inform the first application 502a that the second application 502b is present on the application. The first application 502a may then proceed to associate both of the applications with the controller 512.

FIG. 8 illustrates an example system diagram 800 showing a first application 502a and a second application 502b enrolling with one or more controllers (controllers 512a and 512b), which may be the same as or similar to the controller 512. As shown in FIG. 8, the second application 502b may detect that the first application 502a may be present on the same device, but the second application 502b might not allow the first application 502a to enroll the second application 502b on behalf of the second application 502b. For example, if the first application 502a is a general purpose banking application that may be associated with several different banks and the second application 502b is a banking application for a particular Bank B, the second application 502b might not want to inform the first application 502a that the second application 502b is present because the first application 502a may be associated with a rival bank A (e.g., after the user selects the rival bank A from the list of banks). In such a case, both the first application 502a and the second application 502b may wish to identify themselves (e.g., reveal information) to the other application if the two applications are associated with the same controller, but the two applications might not wish to identify themselves to the other application if the two applications are not associated with the same controller.

In such a case, the first application 502a may make available to the second application 502b a piece of information indicating the identity of the first application 502a and/or the identity (e.g., location) of the controller associated with the first application 502a. According to some aspects, this information may be in a protected or encrypted format such that the controller associated with the first application 502a may be able to read the information, but the second application 502b might not be able to read the information. For example, the controller 512a may generate an encrypted record of the first application 502a's application identifier encrypted with a key K, where K may be known to the controller 512a and might not be known to the second application 502b. The controller 512a may send this encrypted record to the first application 502a, which may then pass the encrypted record to the second application 502b. The second application 502b may then present this information to the second application 502b's controller along with the second application 502's enrollment request. According to some aspects, if the controller associated with the first application 502a and the controller associated with the second application 502b are the same controller (e.g., controller 512a), then the controller 512a may be able to decode the information transmitted by the second application 502b and may learn that the two applications 502a and 502b are on or executing on the same device. The controller 512a may then associate the two applications with each other (e.g., as discussed above). According to some aspects, if the controller of the first application 502a and the controller of the second application 502b might not be the same controller (e.g., controllers 512a and 512b), then the controllers 512a and 512b might not be able to make the association between the two applications 502a and 502b and might not know these two applications are on the same device. According to some aspects, the controller 512a may issue a surrogate or alternative identity of the first application 502a (e.g., additionally or alternatively to the encrypted record) to determine whether any other applications are associated with the first application 502a.

According to some aspects, two or more associated applications may be able to share data and policies between the associated applications. For example, a controller 512a may provide a unified lock/unlock of an encrypted storage 508 or the sharing of network credentials via a single sign on or via a sharing of information between applications. In such a situation, a wrapper 506 may provide a secure conduit for messages sent by one application 502a to another application 502b or for messages sent from one controller to a plurality of applications.

As illustrated in the discussion above, various aspects described herein may be embodied in various forms. For instance, various aspects may be embodied in a method, in a computing device, in computer-executable instructions stored in a computer-readable medium, and/or in an apparatus.

In other examples, various aspects may be embodied in a computing device that includes at least one processor and memory storing computer-readable instructions that, when executed by the at least one processor, cause the computing device to perform any and/or all of the descriptions, steps, processes, and/or methods discussed herein. In still other examples, various aspects of the disclosure may be embodied in one or more computer-readable media (which may, e.g., include a non-transitory computer-readable memory) storing instructions that, when executed by at least one processor, cause the at least one processor to perform any and/or all of the descriptions, steps, processes, and/or methods discussed herein. In yet other examples, various aspects of the disclosure may be embodied in an apparatus comprising one or more means for performing any and/or all of the descriptions, steps, processes, and/or methods discussed herein.

What is claimed is:

1. A method comprising:
    receiving, by a controller service from a client device, a request to associate a first application executing on the client device with the controller service, the controller service being configured to control the first application via one or more policy instructions located on the client device and enforced by a mobility management system on the client device, wherein each of the one or more policy instructions defines one or more restrictions enforced on or one or more enablements granted to the first application by the mobility management system;
    transmitting, by the controller service to the client device, authentication information configured to be used by the first application to authenticate to a gateway device associated with the controller service;
    obtaining, by the controller service, a first application identifier associated with the first application, the first application identifier corresponding to a first set of the one or more policy instructions used to control the first application;
    receiving, by the controller service from an application service, a request for a first service and a conditional application identifier; and
    responsive to the conditional application identifier matching the first application identifier, configuring, by the controller service and based on the request for the first service, the first application with a second set of one or more policy instructions used to control the first application.

2. The method of claim 1, wherein obtaining the first application identifier associated with the first application further comprises generating, by the controller service, the first application identifier associated with the first application.

3. The method of claim 1, wherein obtaining the first application identifier associated with the first application further comprises receiving, by the controller service from the client device, the first application identifier associated with the first application, wherein the first application identifier is generated by the client device.

4. The method of claim 1, further comprising:
    receiving, by the controller service from the first application, a request to associate a second application executing on the client device with the controller service, the controller service being configured to control the second application via one or more policy instructions;
    obtaining, by the controller service, a second application identifier associated with the second application; and
    transmitting, by the controller service to the client device, the second application identifier associated with the second application.

5. The method of claim 1, further comprising:
    receiving, by the controller service from a second application, a request to associate the second application executing on the client device with the controller service and information identifying the first application that is different than the first application identifier;
    obtaining, by the controller service, a second application identifier associated with the second application; and
    associating, by the controller service, the first application identifier with the second application identifier.

6. The method of claim 5, wherein associating the first application identifier with the second application identifier further comprises determining that the first application and the second application are both executing on the client device.

7. The method of claim 5, wherein the information identifying the first application is encrypted with a key known to the controller service and unknown to the second application.

8. The method of claim 1, wherein the client device determines a location of the controller service based on a level of service associated with the first application.

9. A system, comprising:
at least one processor; and
at least one memory storing computer-readable instructions that, when executed by the at least one processor, cause the system to perform:
receiving, by a controller service from a client device, a request to associate a first application executing on the client device with the controller service;
obtaining, by the controller service, a first application identifier associated with the first application, the first application identifier corresponding to a first set of one or more policy instructions used to control the first application;
receiving, by the controller service and from an application service, a request for a first service and a conditional application identifier;
responsive to the conditional application identifier matching the first application identifier, configuring, by the controller service and based on the request for the first service, the first application with a second set of one or more policy instructions used to control the first application;
receiving, by the controller service from a second application executing on the client device, a request to associate the second application with the controller service and information identifying the first application that is different than the first application identifier;
obtaining, by the controller service, a second application identifier associated with the second application; and
associating, by the controller service, the first application identifier with the second application identifier.

10. The system of claim 9, wherein obtaining the first application identifier associated with the first application further comprises generating, by the controller service, the first application identifier associated with the first application.

11. The system of claim 9, wherein obtaining the first application identifier associated with the first application further comprises receiving, by the controller service from the client device, the first application identifier, wherein the first application identifier is generated by the client device.

12. The system of claim 9, wherein the computer-readable instructions further cause the system to perform:
receiving, by the controller service from the first application, a request to associate a third application executing on the client device with the controller service, the controller service being configured to control the third application via one or more policy instructions;
obtaining, by the controller service, a third application identifier associated with the third application; and
transmitting, by the controller service to the client device, the third application identifier associated with the third application.

13. The system of claim 9, wherein the controller service is configured to control the first application via one or more policy instructions located on the client device and is enforced by a mobility management system on the client device, wherein each of the one or more policy instructions defines one or more restrictions enforced on or one or more enablements granted to the first application by the mobility management system, and wherein the client device determines a location of the controller service based on a level of service associated with the first application.

14. The system of claim 9, wherein associating the first application identifier with the second application identifier further comprises determining that the first application and the second application are both executing on the client device.

15. The system of claim 9, wherein the information identifying the first application is encrypted with a key known to the controller service and unknown to the second application.

16. One or more non-transitory computer-readable storage media having computer-readable instructions stored thereon, that when executed by one or more processors, cause the one or more processors to perform:
receiving, by a controller service from a client device, a request to associate a first application executing on the client device with the controller service, wherein the client device determines a location of the controller service based on a level of service associated with the first application;
obtaining, by the controller service, a first application identifier associated with the first application, the first application identifier corresponding to a first set of one or more policy instructions used to control the first application;
receiving, by the controller service from an application service, a request for a first service and a conditional application identifier; and
responsive to the conditional application identifier matching the first application identifier, configuring, by the controller service and based on the request for the first service, the first application with a second set of one or more policy instructions used to control the first application.

17. The computer-readable storage media of claim 16, wherein the computer-readable instructions further cause the one or more processors to perform:
receiving, by the controller service from the first application, a request to associate a second application executing on the client device with the controller service, the controller service being configured to control the second application via one or more policy instructions;
obtaining, by the controller service, a second application identifier associated with the second application; and
transmitting, by the controller service to the client device, the second application identifier.

18. The computer-readable storage media of claim 16, wherein the computer-readable instructions further cause the one or more processors to perform:
receiving, by the controller service and from a second application executing on the client device, a request to associate the second application with the controller service and information identifying the first application that is different than the first application identifier;
obtaining, by the controller service, a second application identifier associated with the second application; and
associating, by the controller service, the first application identifier with the second application identifier.

19. The computer-readable storage media of claim 16, wherein obtaining the first application identifier further comprises generating, by the controller service, the first application identifier.

20. The computer-readable storage media of claim 16, wherein obtaining the first application identifier comprises receiving, by the controller service and from the client device, the first application identifier, wherein the first application identifier is generated by the client device.

* * * * *